United States Patent
Naito

(10) Patent No.: US 7,436,399 B2
(45) Date of Patent: Oct. 14, 2008

(54) IMAGE DISPLAY APPARATUS

(75) Inventor: Keijiro Naito, Shiojir (JP)

(73) Assignee: Seiko Epson Corporation, Tokyo (JP)

( * ) Notice: Subject to any disclaimer, the term of this patent is extended or adjusted under 35 U.S.C. 154(b) by 298 days.

(21) Appl. No.: 10/379,576

(22) Filed: Mar. 6, 2003

(65) Prior Publication Data
US 2003/0218602 A1 Nov. 27, 2003

(30) Foreign Application Priority Data
Mar. 25, 2002 (JP) .............................. 2002-083348

(51) Int. Cl.
*G09G 5/00* (2006.01)
(52) U.S. Cl. ..................... 345/204; 345/169; 348/730
(58) Field of Classification Search ................. 345/204, 345/156, 169; 348/730
See application file for complete search history.

(56) References Cited

U.S. PATENT DOCUMENTS

| | | | | |
|---|---|---|---|---|
| 6,621,489 | B2* | 9/2003 | Yanagisawa et al. | 345/211 |
| 6,704,061 | B2* | 3/2004 | Mears et al. | 348/730 |
| 6,885,428 | B2* | 4/2005 | Hibi et al. | 352/198 |
| 7,265,765 | B1 | 9/2007 | Akaiwa | |
| 2001/0013856 | A1* | 8/2001 | Hamakada et al. | 345/156 |
| 2002/0014951 | A1* | 2/2002 | Kramer et al. | 340/5.8 |
| 2004/0012717 | A1* | 1/2004 | Sprague et al. | 348/564 |
| 2007/0242169 | A1 | 10/2007 | Akaiwa | |

FOREIGN PATENT DOCUMENTS

| | | |
|---|---|---|
| CN | A 1115399 | 1/1996 |
| JP | A-04-309938 | 11/1992 |
| JP | A-06-098272 | 4/1994 |
| JP | A-07-140434 | 6/1995 |
| JP | 08-098121 | * 4/1996 |
| JP | A-2000-253482 | 9/2000 |
| JP | A-2001-305654 | 11/2001 |
| JP | A 2001-332393 | 11/2001 |
| WO | WO 00/004530 | 1/2000 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

A projector (image display apparatus) having enhanced visual mute or A/V mute functions includes a light modulation element for displaying an image, a lamp for illuminating the light modulation element, and a fan for cooling the lamp; the image display apparatus further includes a visual mute means for setting a visual mute mode in which no image or a predetermined image is displayed on a display screen thereof, and a lamp output luminance adjusting means for adjusting the output luminance of the lamp in response to the setting and canceling of the visual mute mode by the visual mute means.

10 Claims, 5 Drawing Sheets

IMAGE DISPLAY APPARATUS

BACKGROUND OF THE INVENTION

1. Field of the Invention

The present invention relates to an image display apparatus, and, more specifically, to a projector including an image display element, a lamp for illuminating the image display element, and a fan for cooling the lamp. The invention also relates to a technique for setting a mode in which no image or a predetermined image is displayed on a display screen of the image display apparatus, without stopping the action of the lamp, and to a technique for canceling such setting.

2. Description of the Related Art

Generally, in a projector of the related art, when the user selects a mode to display no image, or a predetermined image on a display screen (hereinafter referred to as "Visual Mute Mode"), keeping a main power supply in the ON-state, a blackened image is displayed on the display screen, or an image of a desired logo, for example, is displayed on the display screen. In such case, an audio output is also stopped (hereinafter referred to as "Audio Mute"). Such muting function is especially effective in the case of a presentation and the like. The Visual Mute and the Audio Mute are collectively referred to as "A/V Mute", hereinafter.

However, in the related art, luminance intensity of the illumination lamp is maintained even during the visual mute mode or the A/V Mute mode. Therefore, when a blackened image is displayed on the display screen of the image display element, illumination light is transmitted through the display screen and thus the image on the display screen cannot be made completely black. Further, since the cooling fan keeps operating, undesired sound of the fan stands out, and thus the effect of the visual mute or the A/V mute is not achieved sufficiently.

On the other hand, if the illumination lamp is turned OFF when setting the visual mute mode or the A/V mute mode, it takes too long to restore the display in the case of canceling the setting of the mode. This is because an extra-high pressure mercury lamp is used as a light source of the projector because of its high luminous efficacy and short arc length.

Since the extra-high pressure mercury lamp emits light by evaporating mercury encapsulated in a light-emitting tube, it takes a long time until mercury is heated up and completely vaporized, and it needs not less than 1 minute until it becomes stable. In addition, a temperature of the outer wall of the light-emitting tube is kept at about 600° C., and a vapor pressure of mercury is also high while the extra-high pressure mercury lamp is generating light, so that the temperature and the internal pressure of the light-emitting tube are not decreased immediately even when the lamp is turned OFF. Therefore, electrons can hardly move from cathode to anode even when high voltage at a high frequency is applied in such state, so that discharge cannot be started soon in the tube. As a consequence, it is impossible to relight the lamp immediately. It takes several minutes until mercury is restored to a liquid state in which the lamp is ready to relight. Therefore, switching the mode of the display screen between a display mode and the visual mute mode as desired by turning the lamp ON and OFF requires a long waiting time, and hence is inappropriate in terms of users' environments.

SUMMARY OF THE INVENTION

In view of such problems, an object of the invention is to provide an image display apparatus wherein the output luminance of the lamp and the undesired sound of the fan are suitably lowered when setting the visual mute mode or the A/V mute mode, so that the effect of the setting of the mode may be heightened. It is another object of the invention to provide an image display apparatus that is able to restore the normal display quickly when the setting of such a mute mode is canceled.

In order to cope with the problems described above, the invention employs the following construction.

The invention provides an image display apparatus including a light modulation element for image display, a lamp for illuminating the light modulation element, and a fan for cooling the lamp, wherein the image display apparatus includes visual mute means for setting a visual mute mode in which no image or a predetermined image is displayed on a display screen of the image display apparatus, and lamp output luminance adjusting means for adjusting the output luminance of the lamp in response to the setting of the visual mute mode and the cancellation of the setting by the visual mute means. Accordingly, the lamp luminance can be determined appropriately in accordance with the environment when setting the visual mute mode.

Preferably, the lamp output luminance adjusting means functions in such a manner that the output luminance of the lamp is lowered in accordance with the setting of the visual mute mode by the visual mute means, and the output luminance of the lamp is restored to a state before setting the visual mute mode in accordance with the cancellation of the setting. In this arrangement, when the image display apparatus is in the visual mute mode, the visual mute is effectively achieved by eliminating the influence of the illumination light on the display screen, and when the visual mute mode is cancelled, the normal image can be displayed quickly on the screen.

The image display apparatus of the invention includes fan speed adjusting means for adjusting the revolution speed of the fan in response to the setting of the visual mute mode and the cancellation of the setting by the visual mute means. In this arrangement, the revolution speed of the fan can be determined appropriately in accordance with the environment when setting the visual mute mode.

Preferably, the fan speed adjusting means functions in such a manner that the revolution speed of the fan decreases in accordance with the setting of the visual mute mode by the visual mute means, and is restored to a state before the setting of the visual mute mode in accordance with the cancellation of the setting. In this arrangement, when the image display apparatus is in the visual mute mode, the visual mute is effectively achieved by reducing the revolution speed of the fan and hence reducing its undesired sound, and when the visual mute mode is cancelled, the revolution speed of the fan can be restored to the revolution speed under normal control.

The image display apparatus of the invention further includes a speaker for outputting sound, and an audio adjusting means (for A/V Mute function) for adjusting the output of the speaker in response to the setting of the visual mute mode and the cancellation of the setting by the visual mute means. Accordingly, when the visual mute mode is set, the output volume from the speaker can be determined appropriately according to the environment.

Preferably, the audio adjusting means functions in such a manner that the output of the speaker is stopped in accordance with the setting of the visual mute mode by the visual mute means, and the output of the speaker is restored in accordance with the cancellation of the setting. In this arrangement, when the image display apparatus is in the visual mute mode, the audio output is completely stopped, and when the visual mute mode is cancelled, the sound can be quickly output in accordance with the normal image display.

The construction described above is especially effective when it is employed in a projector. This is because recent projectors employ an extra-high pressure mercury lamp having characteristics as described above as a light source in many cases.

BRIEF DESCRIPTION OF THE DRAWINGS

FIG. 3 is a timing chart showing the actions of the lamp in the cases where a visual mute mode is set and cancelled, comparing between the case of this embodiment and the case where the lamp is turned OFF/ON;

DESCRIPTION OF THE PREFERRED EMBODIMENTS

First Embodiment

Figure 1:
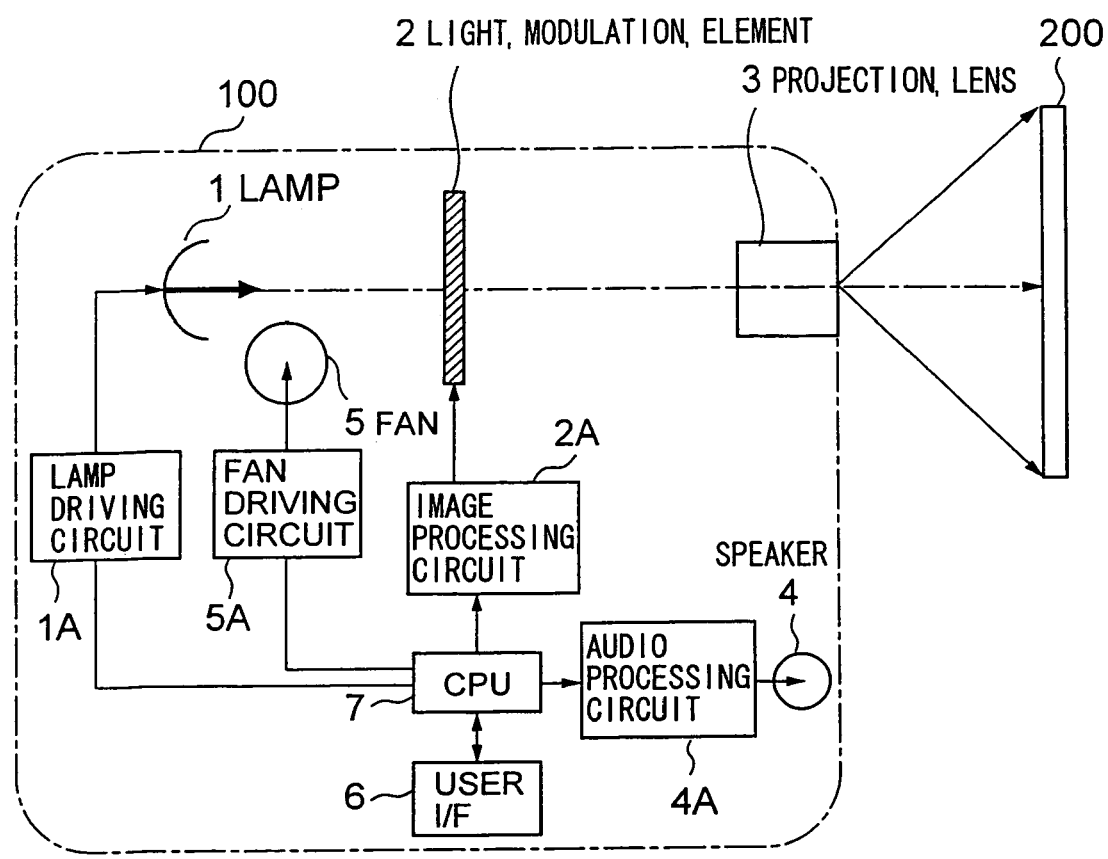
FIG. 1 is a block diagram showing a principal construction of a single panel projector according to an embodiment of the invention.

FIG. 1 is a block diagram showing a principal construction of a single panel projector for describing an embodiment of the invention. An projector 100 includes, as shown in the figure, a lamp 1 as an illumination light source, a light modulation element 2 such as a liquid crystal panel being illuminated by the lamp 1 and displaying images based on predetermined image information, and a projection lens 3 for projecting the images generated by the light modulation element 2. The projector 100 also includes a lamp driving circuit 1A for driving the lamp 1, an image processing circuit 2A for supplying image information to the light modulation element 2, a speaker 4 for outputting sound, an audio processing circuit 4A for supplying audio information to the speaker 4, a fan 5 for cooling the lamp 1 and/or the light modulation element 2, a fan driving circuit 5A for driving the fan 5, a user interface 6 including an input device for supplying various control information and data to the projector 100, and a central processing unit (CPU) 7 for monitoring and controlling the lamp driving circuit 1A, the image processing circuit 2A, the audio processing circuit 4A, the fan driving circuit 5A, and the user interface 6.

The lamp driving circuit 1A, the image processing circuit 2A, the audio processing circuit 4A, the fan driving circuit 5A, and the user interface 6 are briefly described here.

The lamp driving circuit 1A is a power source circuit for supplying a driving power to the lamp 1. The amount of power to be supplied to the lamp 1 by the lamp driving circuit 1A is controlled by the CPU 7, whereby the output luminance of the lamp 1 is adjusted.

The image processing circuit 2A reads signals of an image displayed on a personal computer or stored therein in advance, and supplies them as RGB signals to the light modulation element 2. Various settings for displaying images are also made by the image processing circuit 2A. The image processing circuit 2A is also controlled by the CPU 7.

The audio processing circuit 4A processes audio signals loaded with images to output them through the speaker 4, and the ON-OFF state of the audio output to the speaker 4 is controlled by the CPU 7.

The fan driving circuit 5A supplies a power to the fan 5 for blowing cooling air to the lamp 1 and/or the light modulation element 2, and the amount of power to be supplied is controlled by the CPU 7. Since the recent high luminance lamp generates considerable heat when in use, it is important to cool the lamp down.

The user interface 6 is for inputting various control information or various data from the outside to the projector 100. Loading of image signals from the external personal computer or image signals to be preparedly stored in the projector is performed through the user interface 6. Instructions of various mute settings (or selections) may be performed by the user interface 6.

In the projector 100, while the main power source is ON, the lamp 1 is turned on by the lamp driving circuit 1A and the illumination of the lamp 1 enters into the light modulation element 2. The light modulation element 2 receiving the illumination light from the lamp 1 displays an image on its display screen based on image information sent from the image processing circuit 2A, and the image is projected on a screen 200 via the projection lens 3. In association with the image display, a sound is output from the speaker 4 based on audio information supplied by the audio processing circuit 4A. When the main power supply is turned ON, the fan 5 is driven by the fan driving circuit 5A, so that a temperature of the inside of the projector is kept below a predetermined value. The driving of the fan 5 is automatically controlled by the CPU 7 in accordance with temperatures inside the projector in general cases.

Figure 2:
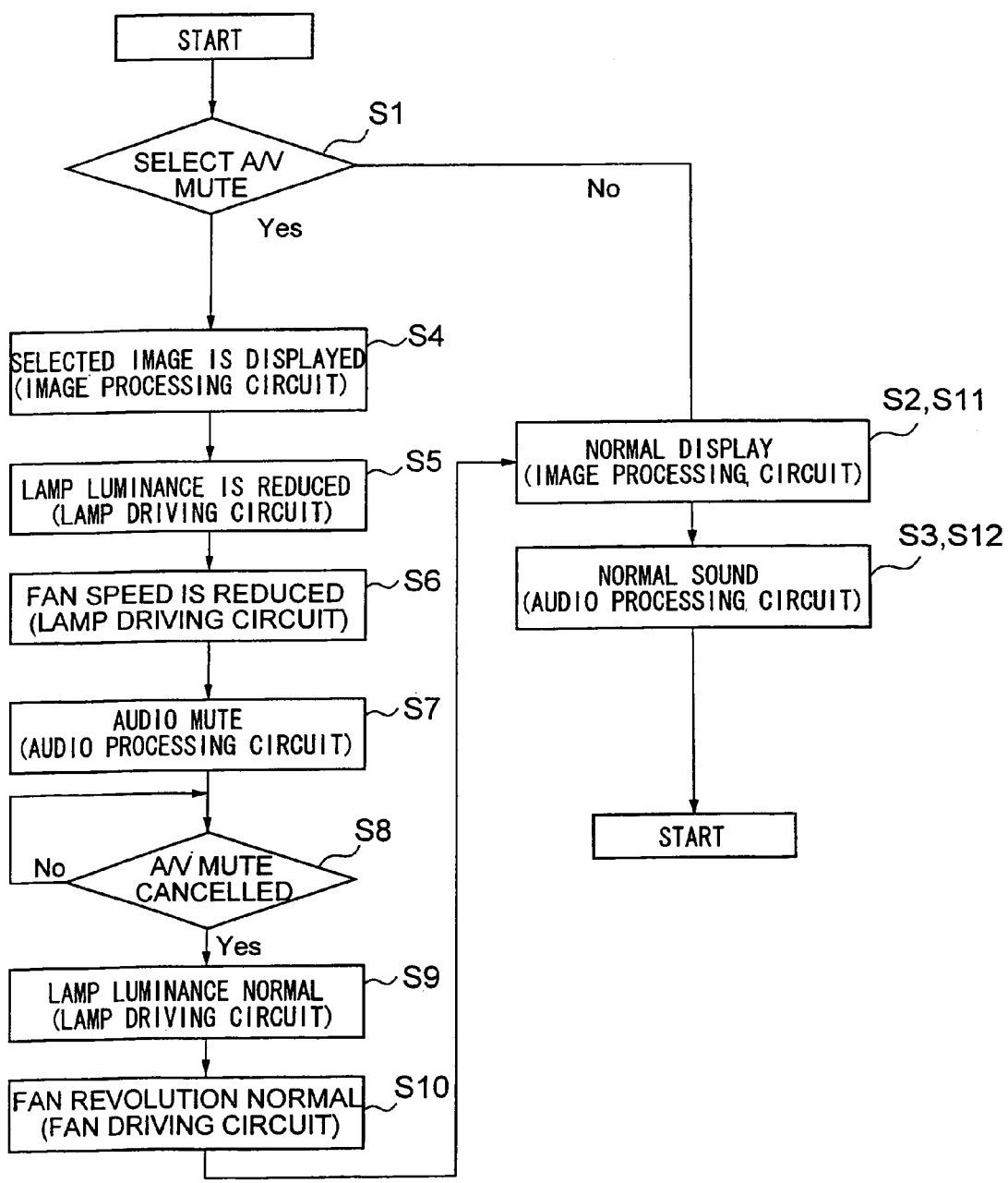
FIG. 2 is a flow chart showing the action relating to setting of an A/V mute mode (involving non-display of image and non-output of sound) of the projector shown in FIG. 1.

Subsequently, the action relating to the A/V mute (non-display of image and non-output of sound) function of the projector 100 and the setting of A/V mute mode will be described based on the flow chart shown in FIG. 2.

When the main power supply of the projector is ON, whether or not selection of A/V mute mode is input through the user interface 6 is monitored (step S1). As a result of monitoring, when the selection of A/V mute mode is not input, the lamp 1, the light modulation element 2, and the speaker 4 are operated by normal control, so that the image display and audio output is achieved (Step S2 and S3).

In contrast, when it is determined that the selection of A/V mute mode is input in Step S1, an image preselected by the user is displayed on the display screen of the light modulation element 2 (Step S4). The selected image may be any image such as a blackened image making the entire display screen black, or a logo image preset by the user.

Subsequently, the lamp drive circuit 1A is controlled to lower the luminance of the lamp 1 to a degree that does not allow the illumination light to transmit through the display screen of the light modulation element 2 (Step S5).

The fan driving circuit 5A is controlled to reduce the revolution speed of the fan 5 to a degree that its undesired sound does not bother the viewer (Step S6).

Furthermore, the audio processing circuit 4A is controlled to stop the audio output from the speaker 4 (Step S7). The amount of reduction of the output luminance of the lamp 1 or the amount of reduction of the revolution speed of the fan 5 at the time when the A/V mute mode is selected may be adjusted as appropriate in accordance with the environment and the object without being limited to the example described above.

After the process from Step S4 to S7 is terminated, whether or not the cancellation of the A/V mute mode is input through the user interface 6 is monitored (Step S8). When the A/V mute mode is still selected, the A/V mute setting described above is maintained.

In contrast to it, when it is determined that the cancellation of the A/V mute mode is input in Step S8, the lamp driving circuit 1A is controlled to restore the luminance of the lamp 1 to a state before setting to the A/V mute mode (Step S9).

The revolution speed of the fan 5 is restored to a state under normal control that controls with a temperature of the inside of the projector (Step S10). In this case, the revolution speed of the fan 5 may be restored to a state before setting to the A/V mute mode.

Then, information of the image displayed before setting to the A/V mute mode or new image information designated by the user is supplied from the image processing circuit 2A to the light modulation element 2, so as to display the image on the display screen of the light modulation element 2 (Step S11).

Further, the audio processing circuit 4A is controlled to be restored to a state before setting to the A/V mute mode so as to output the sound through the speaker 4 (Step S12).

"Monitoring", "determination", and "control" in the steps described above are performed by the CPU 7.

When it is determined that the selection of the A/V mute mode is input in the steps described above, the display screen may be set to the non-display mode (screen display OFF) instead of displaying an image preselected by the user on the display screen of the light modulation element 2.

Furthermore, the order of the steps S4 to S7 at the time when the A/V mute mode is selected, or the order of the steps S9 to S12 at the time when the A/V mute mode is cancelled may be modified, or may be performed simultaneously.

Figure 3:
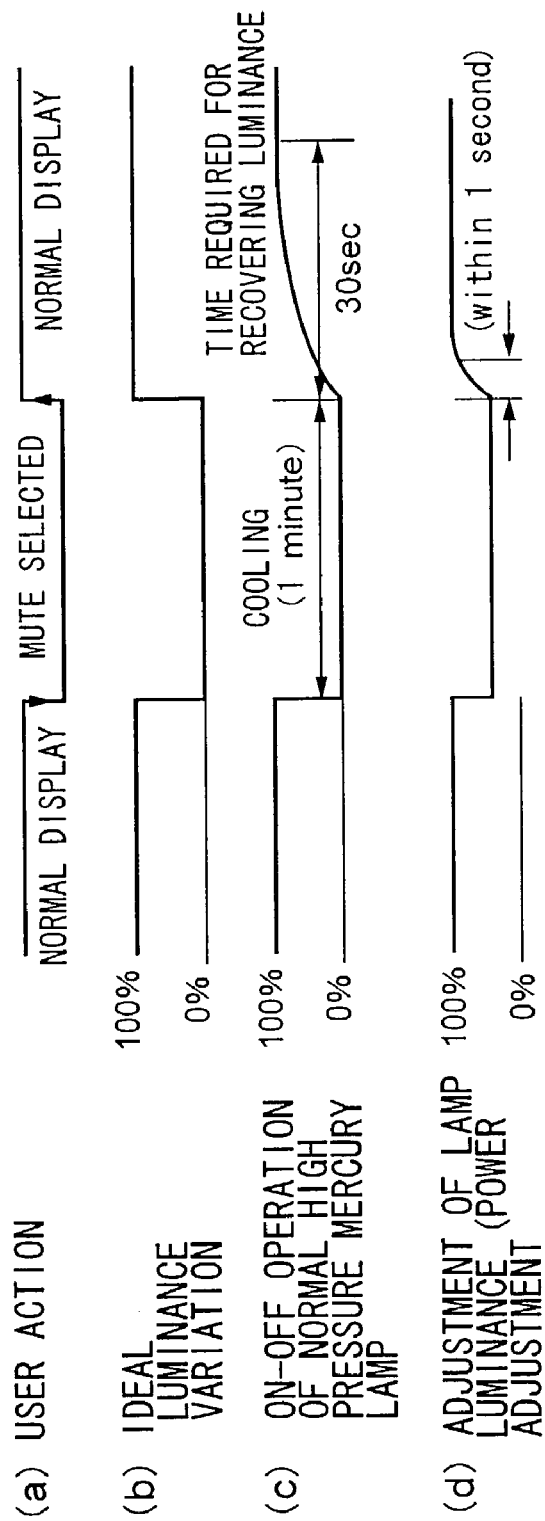

FIG. 3 is a timing chart showing the actions of the lamp 1 in the cases where the A/V mute mode is selected and cancelled, comparing between the case of this embodiment and the case where the lamp 1 is turned OFF/ON.

It is ideal that the luminance of the lamp 1 is varied concurrently (graph b) with the selection and cancellation of the A/V mute mode by the user (graph a). However, it is impossible in the case where the extra-high pressure mercury lamp is employed. For example, in the case when the extra-high pressure mercury lamp is turned OFF by selecting the A/V mute mode, when the A/V mute mode is cancelled to relight the lamp again, it requires about one minute for cooling off the lamp and another thirty seconds or so for recovering the luminance of the lamp to the state before the mute mode (graph c).

In contrast to it, in this embodiment in which the lamp 1 is adjusted to reduce its output luminance by a certain amount without turning off the lamp 1, when the A/V mute mode is selected, the luminance of the lamp 1 is reduced almost concurrently, and when the A/V mute mode is cancelled, the luminance can be recovered to the state before the mute mode with about one second of delay (graph d). Accordingly, the viewer rarely feels delay of image display when the A/V mute mode is cancelled. It is because mercury in the lamp once turned on is kept in the vaporized state and the internal pressure is sufficiently high when the mute mode is switched (selected), whereby the luminance can be changed further quicker than the case where it is first turned ON.

Second Embodiment

Figure 4:
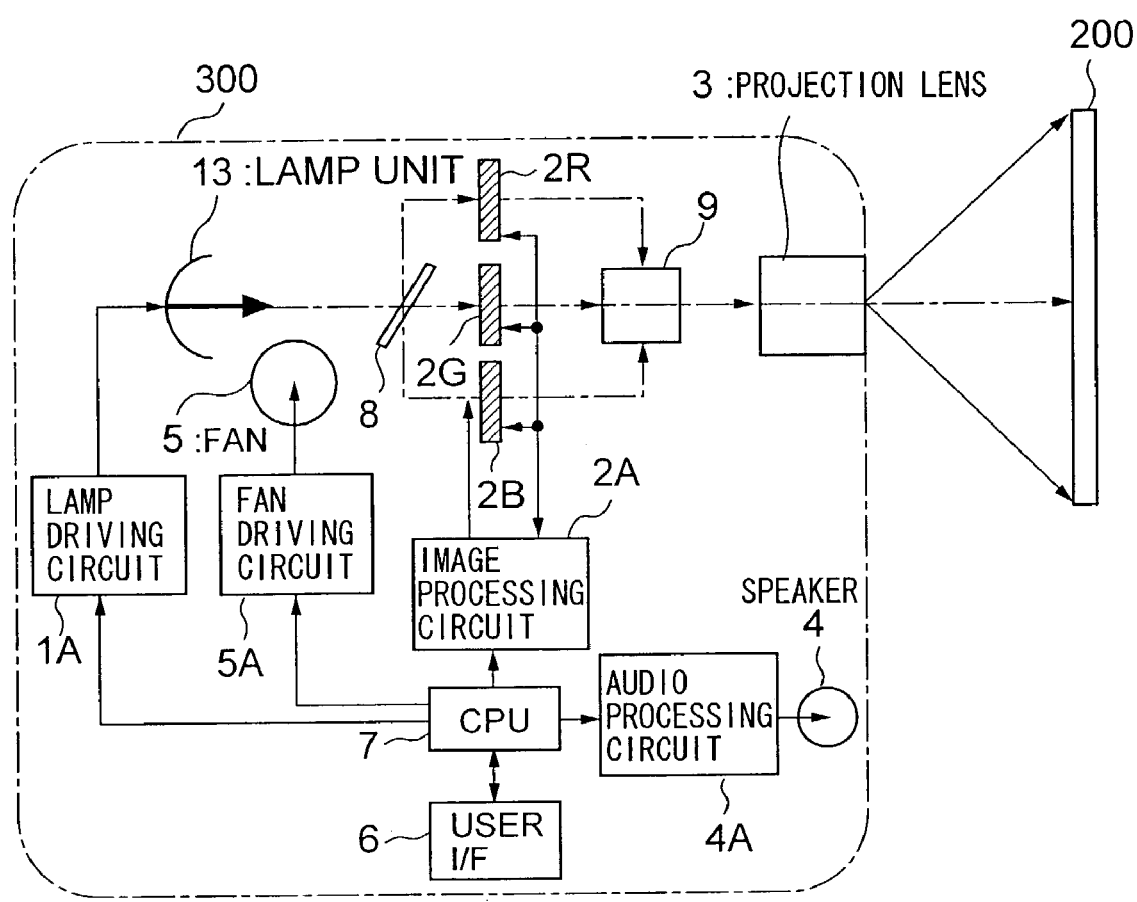
FIG. 4 is a block diagram showing a principle construction of a three-panel projector relating to the second embodiment of the invention.

FIG. 4 is a block diagram showing a principle construction of a three-panel projector for describing the second embodiment of the invention. A projector 300 separates illumination light from a lamp unit 13 into red light (R), green light (G), and blue light (B) using a colored light separating optical system 8, projects the separated colored lights on liquid crystal panels 2R, 2G and 2B, which are light modulation elements provided for the respective RGB signals of an image, to display images thereon, combines the respective colored images by a cross dichroic prism 9, and projects a combined image through the projection lens 3. In FIG. 4, the same reference numerals as FIG. 1 show identical or corresponding components in FIG. 1.

(i) Construction Relating to the A/V Mute Function

In this three-panel projector 300, when the A/V mute mode is set, signals of no image or a predetermined image are sent to the respective liquid crystal panels 2R, 2G, 2B from the image processing circuit 2A to display the image. When the A/V mute mode is cancelled, a process to restore the normal image display is performed on the respective liquid crystal panels. The setting and processes other than these are basically the same as the case of the first embodiment. Therefore, the action process relating to the setting of the A/V mute mode in the second embodiment is performed in accordance with the flowchart in FIG. 2.

(ii) Construction of the Optical Unit

Figure 5:
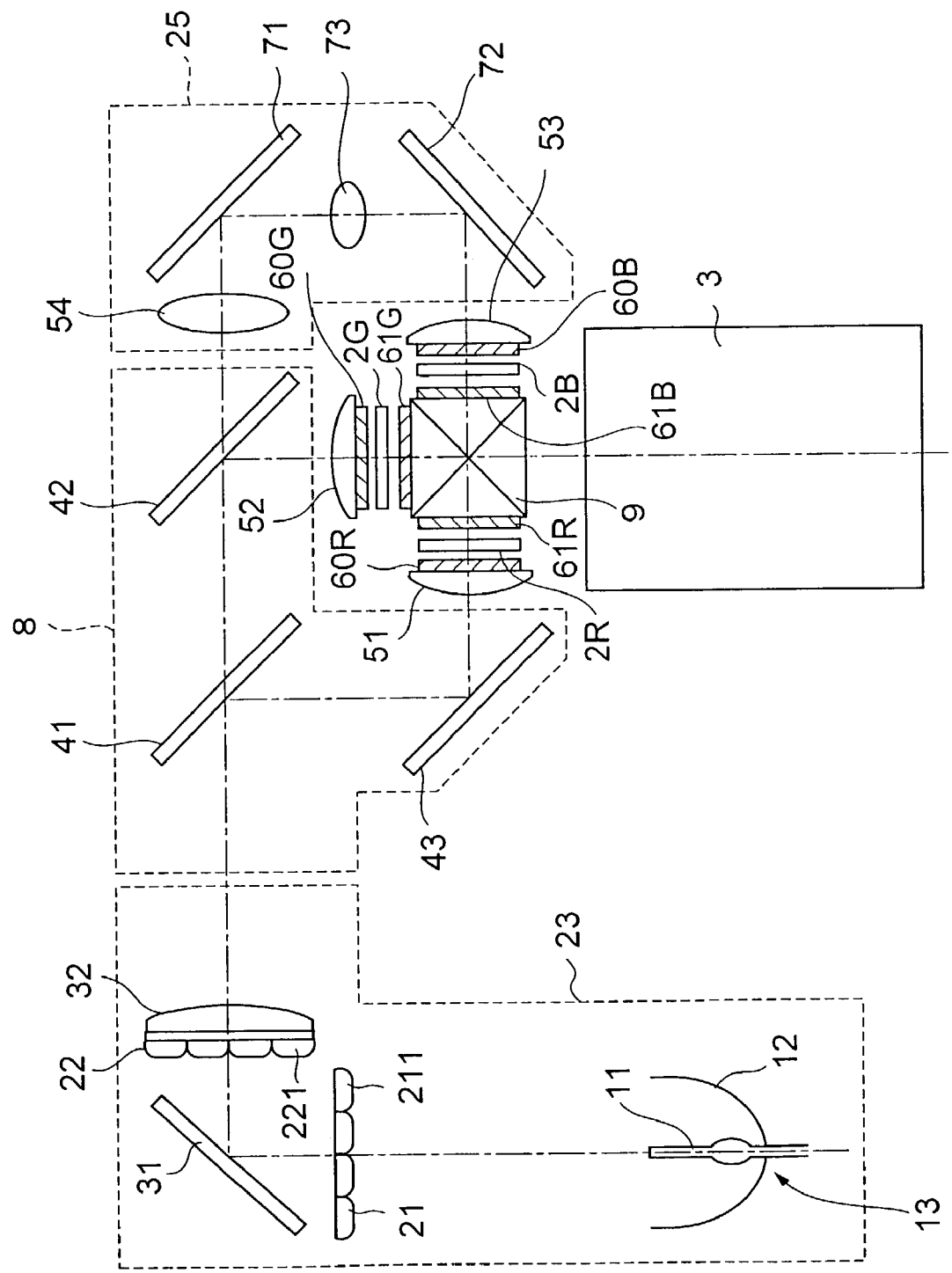
FIG. 5 is a block diagram showing an optical system of the projector in FIG. 4.

FIG. 5 is a block diagram showing an optical system of the projector 300. Referring to FIG. 5, the construction and the operation of the optical unit of the projector 300 will be described below.

This optical unit includes an illumination optical system 23, the colored light separating optical system 8, a relay optical system 25, the liquid crystal panels 2R, 2G and 2B as light modulation units, the cross dichroic prism 9 for combining colored lights, the projection lens 3, and so on.

The illumination optical system 23 includes the lamp unit 13 including a lamp 11 and a reflector 12, a first and a second lens arrays 21, 22 constituting an integrator lens for almost uniformly illuminating the image forming areas of the liquid crystal panels 2R, 2G and 2B, a reflecting mirror 31 (this is not necessary in the case of a layout where the direction of travel of the illumination light is not changed), and a superimposed lens 32.

The first lens array 21 has a construction including small lenses 211 that are substantially rectangular in profile disposed into a matrix of M rows×N columns. The respective small lenses 211 divide parallel light fluxes incoming from the lamp 1 into a plurality (M×N) of partial light fluxes, and allow the respective partial light fluxes to form images in the vicinity of the second lens array 22. The shape of each small lens 211 is determined to be similar to the shape of the image forming areas of the liquid crystal panels 2R, 2G and 2B. For example, when the aspect ratio (ratio between the width and the height) of the image forming area of the liquid crystal panel is 4:3, the aspect ratio of each small lens is set to 4:3 as well.

The second lens array 22 has a construction in which small lenses 221 are disposed into a matrix of M rows×N columns corresponding to the small lenses 211 of the first lens array 21.

The colored light separating optical system 8 includes two dichroic mirrors 41 and 42, and a reflecting mirror 43, and has a function for separating a light projected from the superimposed lens 32 of the illumination optical system 23 into red, green, and blue light.

The relay optical system 25 is an optical path for light transmitted from the dichroic mirror 42, and includes a lens 54 on the incident side, reflecting mirrors 71 and 72, and a relay lens 73.

The liquid crystal panels 2R, 2G and 2B employ, for example, polysilicon Thin-Film-Transistor (TFT) as switching elements, and are fixedly bonded to the cross dichroic prism 9 via fixing members so as to face toward three side surface of the cross dichroic prism 9. Incident-side polarizing plates 60R, 60G, and 60B are disposed on the side of the light incident and outgoing plane of the liquid crystal panels 2R, 2G and 2B, and outgoing-side polarizing plates 61R, 61G and 61B are disposed on the outgoing-side thereof.

The cross dichroic prism 9 is for forming a colored image by combining red, green and blue lights, and is formed with a dielectric material multi-layer film for reflecting red light and a dielectric material multi-layer film for reflecting blue right in a substantially X-shape along the interfaces of four rectangular prism. These dielectric material multi-layer films combine these three colored lights. The projection lens 3 is disposed on the outgoing-side of the cross dichroic prism 9.

(iii) Action of the Optical Unit

Light projected from the lamp 11 is reflected by the reflector 12, and enters into an integrator lens including the first and the second lens arrays 21, 22. Images to be formed by the respective lens cells of the first lens array 21 are focused on the display surface of the respective liquid crystal panels 2R, 2G and 2B by the second lens array 22 and the superimposed lens 32, so that the integrator lens carries out the functions to improve the efficiency of light utilization and eliminate unevenness of illumination on the surface of the liquid crystal panels. Light outgoing from the integrator lens and the superimposed lens 32 subsequently enters into the colored light separating optical system 8.

The first dichroic mirror 41 of the colored light separating optical system 8 reflects red light component and transmits blue light component and green light component of the light flux projected by the illumination optical system 23. Red light reflected from the first dichroic mirror 41 enters into a field lens 51 through the reflecting mirror 43, and reaches the liquid crystal panel 2R for red light. The field lens 51 converts the respective separated light fluxes projected from the second lens array 22 into fluxes in parallel with the central axis (main light beam). Other field lenses 52, 53 provided in front of other liquid crystal panels 2G and 2B act in the same manner.

Green light out of blue light and green light passed through the first dichroic mirror 41 is reflected by the second dichroic mirror 42, passes through the field lens 52, and reaches the liquid crystal panel 2G for green right. On the other hand, blue light passes through the second dichroic mirror 42, the relay optical system 25, and further the field lens 53, and reaches the liquid crystal panel 2B for blue light.

The respective lights in red, green and blue separated by the colored light separating optical system 8 are converted into specific polarized lights by the incident-side polarizing plates 60R, 60G and 60B before entering into the liquid crystal panels 2R, 2G and 2B. Subsequently, the respective polarized lights are modulated in the respective liquid crystal panels 2R, 2G and 2B based on image information given by the image processing apparatus 2A, and projected to the outgoing-side polarized plates 61R, 61G and 61B as modulated lights. Only special polarized light of the modulated light passes through the outgoing-side polarizing plates 61R, 61G and 61B, and enters into the cross dichroic prism 9. The respective colored lights are combined in the cross dichroic prism 9 into a combined light, and projected from the projection lens 3 onto the screen 200 as a color image.

When a polarized beam splitter for converting illuminating light including both P-polarized light and S-polarized light from the lamp unit 13 into any one of those polarized light is disposed at the predetermined position of the illumination optical system 23, for example, between the second lens array 22 and the superimposed lens 32, almost all the light incoming from the lamp unit 13 may be utilized without being wasted in the liquid crystal panels 2R, 2G and 2B.

In the above embodiments, the single panel projector having one light modulation element and the three-panel projector having three liquid crystal panels corresponding to the respective RGB signals have been described as examples. However, any number, such as two or four, of the light modulation elements such as liquid crystal panels may be used.

Although the liquid crystal panel employed in this embodiment is a transmitting type that transmits and modulates light, it may be the type that modulates incoming light while reflecting, and projects the modulated light.

Furthermore, the projector may be any type including a front projecting type that projects on the front surface of the screen and the rear projecting type that projects from the backside of the screen.

In the above embodiments, the visual mute and the output luminance control of the lamp, the audio mute, and speed adjustment of the fan are performed altogether when setting the A/V mute mode. However, it is also possible to combine the set of the visual mute and the output luminance control of the lamp only with the audio mute, or to combine the set only with the speed adjustment of the fan.

Furthermore, although an example in which the visual mute function or A/V mute function are applied to the projector has been described in the above-described embodiments, the invention is not limited to the projector, and it is applicable also to other image display apparatus using a lamp such as an extra-high pressure mercury lamp that requires a relatively long time before illuminating. In this case, preferably, the output luminance of the lamp or the revolution of the fan at the timing of setting the mute mode may be determined appropriately depending on the environment of the image display apparatus.

According to the image display apparatus of the invention, since the luminance of the lamp is reduced and the undesired sound of the fan is also reduced when the visual mute mode or A/V mute mode is set, the influence of light or sound on the viewer is alleviated, and thus the effect of these muting function may be increased. In addition, when canceling the muting mode, the normal screen may quickly be displayed.

What is claimed is:

1. An image projecting apparatus comprising:
   a light modulation element;
   a lamp illuminating the light modulation element;
   a lens for projecting an image formed in the light modulation element on a display screen;
   a visual mute unit for setting a visual mute mode in which a predetermined image is projected on the display screen; and
   a lamp output luminance adjusting unit for adjusting the output luminance of the lamp in response to the setting of the visual mute mode and the cancellation of the visual mute mode, the lamp output luminance adjusting unit lowering the output luminance of the lamp to a predetermined degree by lowering a power supplied to the lamp in accordance with the setting of the visual mute mode without turning off the lamp, and restores the output luminance of the lamp to a state before the setting of the visual mute mode in accordance with the cancellation of the setting of the visual mute mode.

2. The image projecting apparatus according to claim 1, further comprising:
   a fan for cooling the lamp; and
   a fan speed adjusting unit for adjusting the revolution speed of the fan in response to the setting and the cancellation of the visual mute mode.

3. The image projecting apparatus according to claim 2, wherein the fan speed adjusting unit decreases the revolution speed of the fan in accordance with the setting of the visual mute mode, and restores the revolution speed to a state before the setting of the visual mute mode in accordance with the cancellation of the setting.

4. The image projecting apparatus according to claim 2, further a speaker for outputting sound, and an audio adjusting unit for adjusting the output of the speaker in response to the setting and the cancellation of the visual mute mode.

5. The image projecting apparatus according to claim 3, further comprising a speaker for outputting sound, and an audio adjusting unit for adjusting the output of the speaker in response to the setting and the cancellation of the visual mute mode.

6. The image projecting apparatus according to claim 5, wherein the audio adjusting unit stops output of the speaker in accordance with the setting of the visual mute mode, and restores output of the speaker in accordance with the cancellation of the setting.

7. The image projecting apparatus according to claim 4, wherein the audio adjusting unit stops output of the speaker in accordance with the setting of the visual mute mode, and restores output of the speaker in accordance with the cancellation of the setting.

8. The image projecting apparatus according to claim 1, further comprising a speaker for outputting sound, and an audio adjusting unit for adjusting the output of the speaker in response to the setting and the cancellation of the visual mute mode.

9. The image projecting apparatus according to claim 8, wherein the audio adjusting unit stops output of the speaker in accordance with the setting of the visual mute mode, and restores output of the speaker in accordance with the cancellation of the setting.

10. The image projecting apparatus according to claim 1, further comprising:
- a memory for storing images; and
- a user interface for selecting one of the images;
- wherein the visual mute unit is capable of sending the selected image as the predetermined image to the light modulation element during the visual mute mode.

* * * * *